United States Patent
Trinick et al.

(10) Patent No.: US 9,316,243 B2
(45) Date of Patent: Apr. 19, 2016

(54) METHOD FOR FORMING A JOINT IN A STACK OF LIGHT METAL ALLOY SHEETS

(75) Inventors: Russell John Trinick, Flintshire (GB); Christopher James Clarke, Cheshire (GB)

(73) Assignee: Henrob Limited, Flintshire (GB)

( * ) Notice: Subject to any disclaimer, the term of this patent is extended or adjusted under 35 U.S.C. 154(b) by 254 days.

(21) Appl. No.: 13/884,906

(22) PCT Filed: Nov. 9, 2011

(86) PCT No.: PCT/GB2011/001566
§ 371 (c)(1),
(2), (4) Date: May 10, 2013

(87) PCT Pub. No.: WO2012/063012
PCT Pub. Date: May 18, 2012

(65) Prior Publication Data
US 2013/0336745 A1    Dec. 19, 2013

(30) Foreign Application Priority Data
Nov. 11, 2010    (GB) .................................. 1019021.3

(51) Int. Cl.
*B21J 15/02*    (2006.01)
*F16B 19/08*    (2006.01)
*F16B 5/04*    (2006.01)

(52) U.S. Cl.
CPC ............. *F16B 19/086* (2013.01); *B21J 15/025* (2013.01); *F16B 5/04* (2013.01); *Y10T 29/49943* (2015.01); *Y10T 29/49956* (2015.01); *Y10T 29/5377* (2015.01)

(58) Field of Classification Search
CPC ................... Y10T 29/49837; Y10T 29/49956; Y10T 29/49943; B21J 15/025; F16B 19/086; F16B 19/06; F16B 19/04
See application file for complete search history.

(56) References Cited

U.S. PATENT DOCUMENTS

| 3,726,553 A | 4/1973 | Reynolds et al. |
| 4,074,608 A | 2/1978 | Siebol |

(Continued)

FOREIGN PATENT DOCUMENTS

| DE | 4431769 | 3/1996 |
| DE | 20319610 | 3/2004 |

(Continued)

OTHER PUBLICATIONS

Machine translation of Singh Sumanjit DE202006013981, dated Nov. 16, 2006 (28 pages).

(Continued)

*Primary Examiner* — Jermie Cozart
(74) *Attorney, Agent, or Firm* — Michael Best & Friedrich LLP

(57) ABSTRACT

A self-piercing rivet (10) for forming joints in stacked sheets of high or low strength, light alloy metals such as aluminum and magnesium. The rivet (10) comprises a head (11) and a substantially cylindrical shank (12) that is at least partially hollow so as to define a bore (13) that extends along at least part of its length. The outside diameter (D1) of the shank (12) is at least 6 mm, the effective length of the rivet is at least 1.3 times the diameter of the shank and the bore (13) has a volume that is at least 38% of the effective solid volume of the rivet (10). The rivet geometry is such that it has enhanced column strength to withstand the high insertion forces required and a high bore volume to accommodate displaced sheet material.

3 Claims, 6 Drawing Sheets

(56) References Cited

U.S. PATENT DOCUMENTS

| | | | |
|---|---|---|---|
| 4,580,936 A | 4/1986 | Francis et al. | |
| 5,172,467 A | 12/1992 | Mueller | |
| 6,325,584 B1 | 12/2001 | Marko et al. | |
| 6,385,843 B1 | 5/2002 | Singh et al. | |
| 7,628,573 B2 | 12/2009 | Philipskotter et al. | |
| 2004/0068854 A1* | 4/2004 | Kato | B21J 15/025 29/432.2 |
| 2007/0104553 A1* | 5/2007 | Philipskotter | F16B 19/086 411/176 |
| 2010/0232906 A1 | 9/2010 | Singh et al. | |

FOREIGN PATENT DOCUMENTS

| | | |
|---|---|---|
| DE | 202006013981 | 11/2006 |
| EP | 0202465 | 11/1986 |
| EP | 0433938 | 6/1991 |
| EP | 0833063 | 4/1998 |
| EP | 1229254 | 8/2002 |
| EP | 1783381 | 5/2007 |
| EP | 2024651 | 2/2009 |
| GB | 1471666 | 4/1977 |
| JP | 9317730 | 12/1997 |
| JP | 2001159409 | 6/2001 |
| WO | 85/05414 | 12/1985 |
| WO | 00/45056 | 8/2000 |
| WO | 03/066278 | 8/2003 |
| WO | 2007/132194 | 11/2007 |
| ZA | 918340 | 10/1991 |

OTHER PUBLICATIONS

PCT/GB2011/001566 International Search Report dated Jan. 25, 2012 (2 pages).

* cited by examiner

METHOD FOR FORMING A JOINT IN A STACK OF LIGHT METAL ALLOY SHEETS

BACKGROUND OF THE INVENTION

I. Field of the Invention

The present invention relates to a self-piercing rivet of the kind that is inserted into sheet material without full penetration such that a deformed end of the rivet remains encapsulated by an upset annulus of the sheet material. It also relates to a method for forming a joint with such a rivet and to a rivet insertion system.

II. Description of Related Art

A self-piercing rivet generally has a head and a partially hollow shank. It is driven by a punch into the sheet material such that it pierces the top sheet and forms a mechanical interlock with the bottom sheet with the head often (but not always) flush with the upper surface of the top sheet. Since the bottom sheet is not pierced there is a reduced risk of corrosion occurring in the completed joint. Using self-piercing rivets in a joining process reduces the number of production steps as compared to conventional riveting in which a hole first has to be drilled into the sheet material before the rivet is inserted and then its projecting ends upset.

Self-piercing riveting has been used to great commercial success in the automobile industry where light-weight materials, such as aluminium, have been adopted for vehicle body panels in the interests of weight reduction and therefore reduced energy consumption. Aluminium is difficult or not feasible to spot weld, particularly to steel, owing to its high thermal conductivity, low melting range and propensity to form oxide surface film.

More recently in the automotive industry there has been a move towards using high strength sheet metals. Our European patent no. 2024651 describes a self-piercing rivet particularly suitable for joining high strength, thick stack steels. Since such steels have a high ultimate tensile strength the insertion forces applied to the rivet are necessarily high there is thus a significant risk of rivet collapse. The rivets must be treated to give them a medium/high hardness value (e.g. 450-510 Hv) so that they have sufficient strength. It has been established that such a rivet is not always suitable for use with thick stack, high strength light metal alloys such as magnesium and aluminium alloys especially where the material combination may have three or more layers. Moreover, other conventional rivets are not generally suitable for joining such materials.

Aluminium alloy sheet material generally exhibits superior ductility and so dies with relatively deep cavities tend to be used but the joints suffer from the tendency for the middle sheets to push through the lowermost sheet in the insertion process. This leaves a weakened joint which is often prone to corrosion and it may not be possible to produce a satisfactory joint repeatedly in a mass production environment.

SUMMARY OF THE INVENTION

It is one object of the present invention to obviate or mitigate the aforesaid disadvantages. It is also an object of the present invention to provide for an improved or alternative self-piercing rivet.

According to a first aspect of the present invention there is provided a self-piercing rivet comprising a head and a substantially cylindrical shank that is at least partially hollow so as to define a bore that extends along at least part of its length, wherein the outside diameter of the shank is at least 6 mm, the effective length of the rivet is at least 1.3 times the diameter of the shank and the bore has a volume that is at least 38% of the effective solid volume of the rivet.

The effective length of a rivet in this context is the length of the rivet that is intended to be embedded in the final joint. For example, where the head of the rivet is designed to stand proud of the upper surface of the top sheet material in the finished joint, the effective length is the overall length of the rivet minus the thickness of any part of the rivet head that is intended to remain above the upper surface of the finished joint. The effective solid volume of a rivet is the volume of that part of the rivet that is intended to be embedded in the final joint i.e. the solid volume of the rivet excluding any part of the rivet head that is intended to remain above the upper surface of the finished joint. For a rivet with a substantially cylindrical shank that is hollow or partially hollow, the solid volume is determined as if the shank were solid i.e. it includes the volume of the bore.

Some rivet types have a head that is designed to be embedded in the sheet material such that its flat upper surface is substantially flush with the upper surface of the top sheet of material in which case the effective length is equivalent to the overall length of the rivet. Other rivet types have a head which is intended to stand proud of the upper sheet of material, such as for example pan head or domed head rivets. In the latter types the underside of the head is intended to abut the surface of the top sheet of material such that the full length of the shank is embedded in the final joint.

In one preferred embodiment the bore has a volume that is in the range 38% to 50% of the effective solid volume of the rivet. More preferably the range is 38% to 42%

The outside diameter of the shank has no upper limit. However, it will be appreciated that as the rivet diameter gets larger so will the weight of the rivet. Moreover, larger rivets mean that the equipment required to insert the rivets becomes more bulky and expensive and consume more power. Larger rivets are thus likely to have limited applications. Furthermore, the force required to insert the rivet increases with the outside diameter in view of the increase surface area of the outside of the rivet. In one embodiment the outside diameter of the shank exceeds 8 mm.

The length of the shank is limited only by the manufacturing process. Rivets that are particularly long are difficult to extrude.

The hardness of the rivet may be in the range 250 Hv to 650 Hv.

The rivet preferably has a piercing end opposite the head and the bore may taper outwardly at the piercing end. There may be an arcuate transition between the head and the shank.

In a second aspect of the present invention there is provided a self-piercing rivet comprising a head and a substantially cylindrical shank that is at least partially hollow so as to define a bore that extends along at least part of its length, wherein the outside diameter of the shank is at least 8 mm, and the bore has a volume that is at least 38% of the effective solid volume of the rivet.

According to a third aspect of the present invention there is provided a method for forming a joint in a stack of at least two sheets of light metal alloy having an ultimate tensile strength in the range 50 to 600 MPa, the stack having a thickness of at least 6.0 mm, using a self-piercing rivet comprising the steps of: positioning the material over a die; providing a self-piercing rivet having a head and a substantially cylindrical shank that is at least partially hollow so as to define a bore that extends along at least part of its length; positioning the rivet over the sheet material at a position opposite the die; using a punch to set the rivet and force it into the sheet material such that it pierces at least an uppermost sheet of the stack and such that the shank deforms outwardly to interlock with the material but without penetration of the lowermost sheet in the stack; wherein the outside diameter of the shank is at least 6 mm, the effective length of the rivet is at least 1.3 times the diameter of the shank and the bore has a volume that is at least 38% of the effective solid volume of the rivet.

A light metal alloy is a term used to refer to alloys based on low density metals and in particular metals having a density lower than that of steel. It includes in particular, aluminium alloys and magnesium alloys.

For a rivet shank having an outside diameter, the die may have a die cavity with a maximum depth in the range 0.5 to 3.5 mm. However, the die cavity may fall outside of the upper limit of this range for dies with a larger shank outside diameter.

According to a fourth aspect of the present invention there is provided a method for manufacturing a component including forming a joint in accordance with the method defined above.

According to a fifth aspect of the present invention there is provided a rivet insertion system comprising a punch for applying an insertion force to a self-piercing rivet, a die into which the material being riveted is deformed and a rivet as defined above.

The system may further comprise a rivet feed for feeding rivets to the punch from a bulk store. The punch may be part of a rivet insertion tool, the rivets being fed to a nose of the tool.

The system may further comprise a C-frame to which the tool is mounted. The C-frame may have a first limb to which the tool is mounted and a second limb on which an upsetting die is supported. The C-frame may be supported for movement by a robot handler.

The system may also comprise a controller for controlling the operation of the tool and/or the feed.

BRIEF DESCRIPTION OF THE DRAWINGS

Specific embodiments of the present invention will now be described, by way of example only, with reference to the accompanying drawings in which:

FIG. 8b is an underneath view of the joint of FIG. 8a;

DETAILED DESCRIPTION

Figure 1:
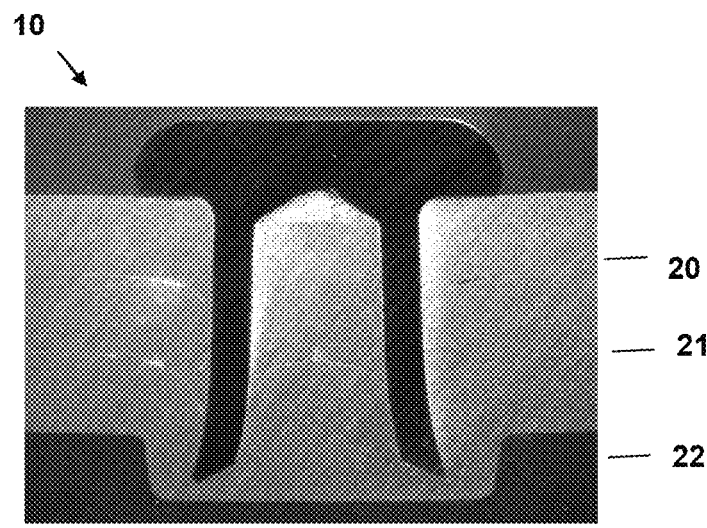
FIG. 1 is a sectioned view of a rived joint using a self-piercing rivet in accordance with a first embodiment of the present invention.
Figure 2:
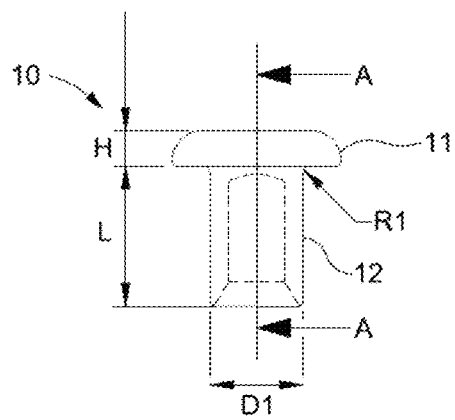
FIG. 2 is a side view of the self-piercing rivet used in FIG. 1.
Figure 3:
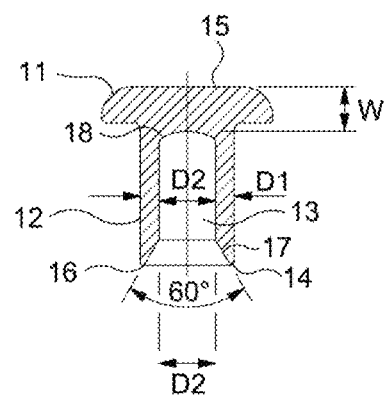
FIG. 3 is a sectioned view taken along the central axis of the rivet of FIG. 2.
Figure 4:
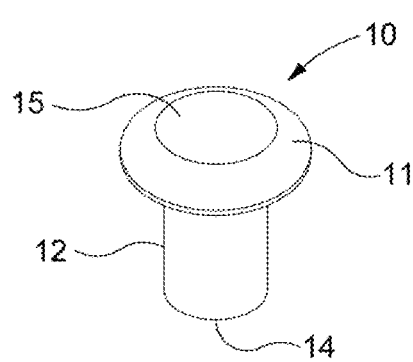
FIG. 4 is an isometric perspective view of the rivet of FIG. 2.

Tests performed by the inventors have established that a self-piercing rivet suitable for high strength, thick stack steels such as that described in our European patent No. 2024651 is not always suitable for thick stack, light metal alloys such as magnesium or higher strength aluminiums. These materials generally exhibit reduced ductility and thus have a tendency to fracture when used with conventional dies. The "button" of material that is deformed into the die tears during the rivet insertion process. This is undesirable as the finished joint is weakened and prone to corrosion. It has been realised by the inventors that such material should be joined by using a die with a relatively small volume die cavity (i.e. a shallow die) in order to avoid tearing. However, a reduction in the die depth serves to increase the force experienced by the rivet during insertion. Moreover, it has been found that there is a tendency for the end of the rivet shank to drag sheet material down through the joint to such an extent that it is pushed through and out of the lowermost sheet, resulting in a joint that is prone to corrosion and may also be considered unacceptable in aesthetic appearance.

It has been established by the inventors that other existing rivets are also not generally suitable for joining relatively thick stacks of higher strength, light metal alloys. The higher strength and low ductility of such material generally means that the rivet experiences higher stress during the joining operation and this is compounded when a shallow die is used. Conventional self-piercing rivets are not capable of withstanding these high stresses in such a manner that the deformation of the rivet shank remains controllable to ensure the final joint is of satisfactory quality. Simply manufacturing the rivet from a higher strength material does not generally achieve the desired results as the corresponding reduced ductility can cause the rivet shank to crack as it attempts to deform during insertion. In order to form a suitable joint with satisfactory strength and corrosion resistance the shank of the rivet needs to have sufficient column strength to pierce the top sheet of material without buckling but yet flare outwardly during insertion in a repeatable and predictable manner without tearing or cracking in order to form a satisfactory joint.

Similarly, when such rivets are used to join thick stacks of lower strength, higher ductility light metal alloys the inventors have noticed that there is a tendency for the lowermost sheet to thin and material from the sheet immediately above is dragged down and often pushes through the lowermost sheet, resulting in a joint that is prone to corrosion.

One typical approach to strengthening the shank of a self-piercing rivet is to increase the thickness of the shank wall but this increases the tendency of the shank to crack during insertion of the rivet. Another approach is to increase the depth of material below the head (known as the rivet "web") thus reducing the length of the unsupported hollow part (the bore) of the shank but this is counter-productive as the volume of sheet material displaced by the rivet is less readily accommodated within the bore leading to the detrimental effects discussed above. The relatively low ductility of the rivet material only allows for limited deformation and displacement of material before it tends to crack rendering it susceptible to fatigue. In view of this self-piercing rivets are not successfully used in thick stack, high strength light alloy applications. A further approach is to increase the hardness of the rivet material but this only increases the tendency of the rivet to fracture as the shank deforms outwardly during the joining process.

Referring now to FIGS. 1 to 4 of the drawings the exemplary self-piercing rivet 10 is substantially cylindrical with a head 11 that extends radially outwards from a depending shank 12 that is hollow so as to define a central bore 13. The shank has a piercing end 14 distal from the head. This particular rivet is made from carbon-manganese boron steel conforming to BS EN 10263:2001 steel grade 36MnB4. It will be appreciated that rivets of other suitable steel compositions may be used.

The head 11 of the rivet 10 has a substantially constant diameter that is integrally formed with an upper end of the shank 12 and a substantially planar upper surface 15 to which a force is applied to insert the rivet into the workpiece. The rivet is configured such that in the final joint the head stands proud of the upper surface of the workpiece. However, other rivet embodiments in accordance with the invention may have a head portion that is designed to have its upper surface substantially flush with the surrounding surface 15 in the finished joint.

The upper end of the shank 12 flares outwardly with a radius R1 to meet with the underside of the head 11. This radius serves as a transition surface between the head 11 and the shank 13. The shank has an outside diameter D1, an inside diameter D2 and an axial length L. The rivet has an overall length H+L where H is the depth of the head.

In the embodiment shown in FIGS. 1 to 4 the rivet has the following dimensions:

$D1=6.5$ mm+/−0.1 mm $D2=4.0$ mm+/−0.1 mm $L=10$ mm+/−0.1 mm $H=2.5$ mm+/−0.1 mm $R1=0.75$+/−0.25 mm.

The piercing end 14 of the rivet comprises a flat annular piercing edge 16 that extends in a plane substantially parallel to that occupied by the upper surface 15 of the head 11. The central bore 13 in the shank 12 is cylindrical and extends from a position just under the head 11 to the piercing edge 16. It has a substantially constant diameter along it length but as it approaches the piercing end 14 the central bore 13 increases in diameter by virtue of an outward conical taper 17 on the inner surface of the shank 12. In the exemplary embodiment the taper 17 has an inclusive angle of 60° but it will be appreciated that other angles may be adopted.

The bore 13 terminates just short of the underside of the head 11 at a base surface 18 that is slightly conical. There is an arcuate transition of radius R2 between the base surface 18 and the inside surface of the shank 12. The minimum thickness of the web of material between the base surface 18 of the bore 13 and the upper surface 15 of the head 11 is labelled as W in FIG. 4 and in the particular embodiment shown is 3 mm+/−0.1 mm such that the base surface 18 is offset from the underside of the head 11 by 0.5 mm. The bore depth is 9.5 mm.

The rivet is heat treated to provide a hardness of 250 Hv-650 Hv and is inserted into sheet material by a punch of a known rivet setting tool over a die with a relatively shallow die cavity (1.4 mm in joint of FIG. 1). In FIG. 1 the rivet 10 is shown after insertion into three sheets 20, 21, 22 of high strength aluminium alloy (Ac300 T61) each of 2.45 mm thick. As can be seen from the figure, the rivet exhibits sufficient column strength to prevent significant compression. The geometry of the rivet allows the displaced sheet material to be accommodated within the central bore 13 of the rivet 10 without creating excessive stress. This allows the shank 11 of the rivet 10 to deform in such a way that it provides a symmetric interlock in the lower sheet 22 as illustrated.

It has been realised by the inventors that sufficient column strength of the rivet can be advantageously achieved by using an increased outside diameter rather than simply increasing the thickness of the shank or increasing the thickness of the rivet web. Moreover, it has been realised that the bore volume needs to be a significant proportion of the volume of the rivet that is embedded in the joint to ensure that the displaced sheet material can be accommodated particularly as the depth of the die deliberately has to be made relatively shallow in view of the low ductility of the sheet material that only permits relatively small deformation before tearing. It has been established that in order to be effective in this context the bore volume should be greater than 38% of the effective solid volume of the rivet (that is the solid volume of the rivet that is embedded in the final joint, including the volume of the bore but not including the head if that is designed to stand proud of the upper surface of the sheet material in the finished joint). The rivet should have a relatively long shank for use with thick sheet material or thick stacks of such material. It is envisaged that the present invention applies to rivets that have an effective length that is at least 1.3 times the outside diameter of the shank.

The rivet geometry thus provides adequate column strength to withstand the high stress encountered during insertion and a high bore volume to accommodate displaced sheet material. The rivet geometry is somewhat counter-intuitive as conventional approach to improving column strength is to make increase the thickness of the shank wall and the web, thus reducing the available bore volume.

FIGS. 5 to 8 show the results of tests performed by the inventors on both prior art self-piercing rivets and self-piercing rivet embodiments in accordance with the present invention. In each instance a joint formed in sheets of aluminium alloy with a prior art rivet is shown alongside a joint in the same sheet material but formed with a rivet in accordance with the present invention. In each of the figures the lowermost sheet has been chemically treated after cutting through the joint to provide a contrast with the next sheet so that the deformation can be clearly observed.

Figure 5A:
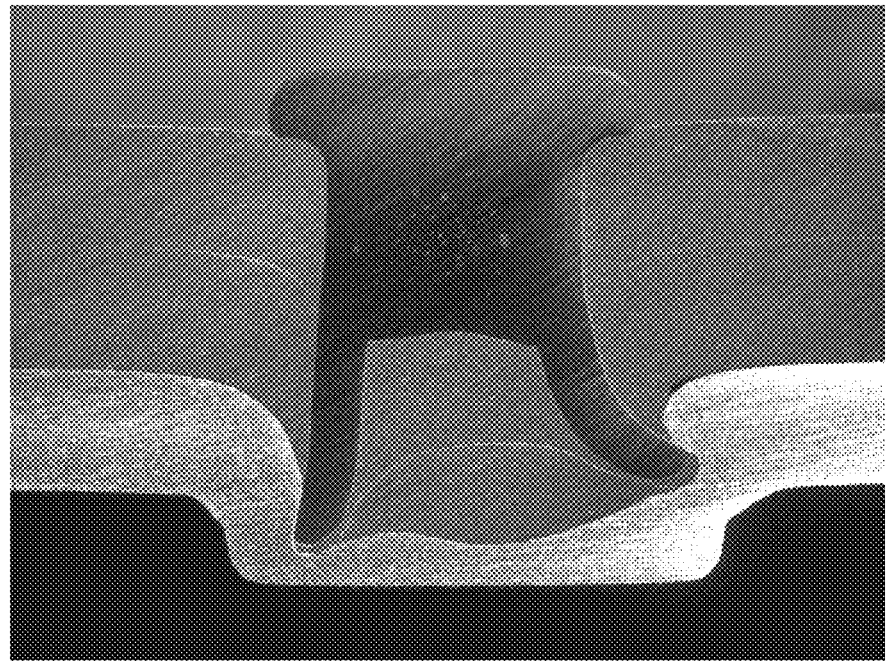
FIGS. 5a and 5b show sectioned views through two riveted joints prepared for comparative purposes: one using a prior art self-piercing rivet and the other using a self-piercing rivet in accordance with a second embodiment of the present invention.
Figure 5B:
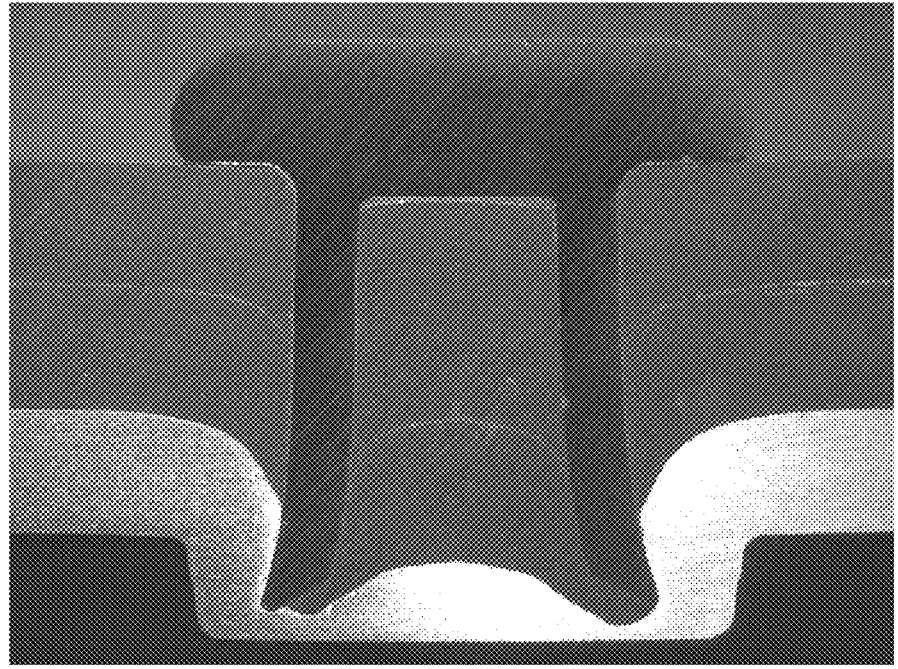

FIG. 5a is an illustration of a joint produced by inserting a prior art self-piercing rivet of high hardness (circa 530-580 Hv) into three overlying sheets of high strength aluminium Ac300 T61, each of 2.45 mm thickness, using a die having a cavity depth of 1.4 mm. The rivet has a shank outer diameter of 5.3 mm, an inner diameter of 3.2 mm and an effective length of 10.0 mm. This is shown alongside FIG. 5b in which a self-piercing rivet in accordance with the present invention is inserted into the same sheet material using a die having the same depth. It can be seen that the rivet of FIG. 5a has not deformed consistently around the shank and has partially collapsed as a result of insufficient column strength in the shank to support the forces experienced during insertion. There is also insufficient mechanical interlock between the rivet and the lowermost sheet. It has been realised by the inventors that the rivet has insufficient bore volume to accommodate the displaced sheet material and as a result a satisfactory interlock is not achieved. In FIG. 5b the rivet has a shank outer diameter of 6.5 mm, an inside diameter of 4.0 mm, an effective length of 10.0 mm and is heat treated to a medium hardness (450-510 Hv). The effective length of the rivet is the same as the shank length in this instance as the head of the rivet is designed to remain above the exposed upper surface of the joint. As in the embodiment of FIGS. 1 to 4, the central bore terminates just short of the underside of the head at a base surface.

The self-piercing rivet of FIG. 5b has sufficient column strength to prevent significant compression even with a large bore volume. The displaced sheet material is readily accommodated by the bore thereby reducing the stress experienced by the rivet during insertion. This allows the rivet to pierce the upper sheets and to provide a symmetric interlock with the lowermost sheet. It was established that the geometry of the rivet provides sufficient column strength such that a rivet of lower hardness could be used thereby allowing the rivet shank to deform radially outwards without risk of fracture.

Figure 6A:
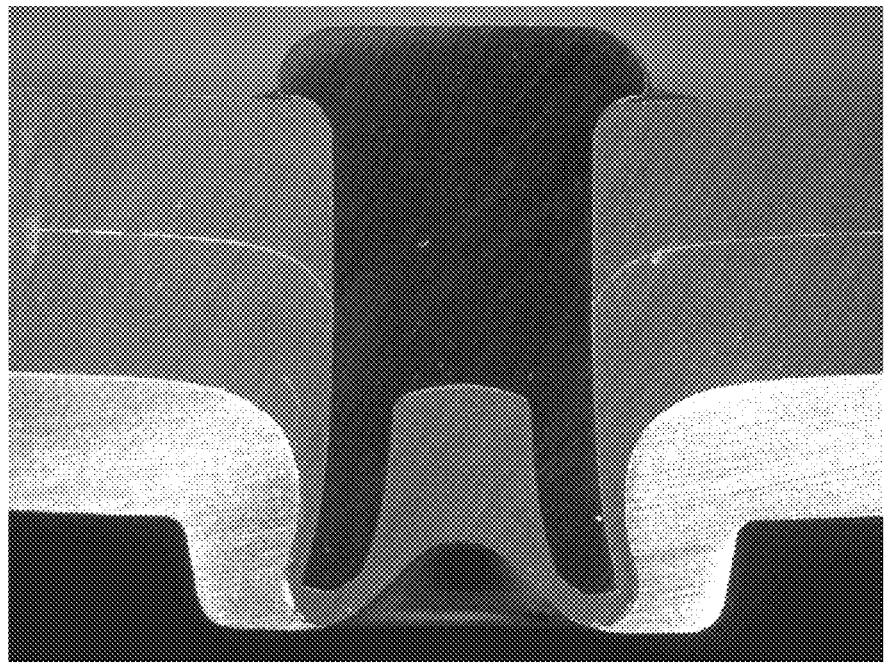
FIGS. 6a and 6b show sectioned views through two riveted joints for comparative purposes: one using a prior art self-piercing rivet and the other using a self-piercing rivet in accordance with a third embodiment of the present invention.

FIG. 6a is an illustration of a joint produced by the inventors by inserting a prior art self-piercing rivet of medium hardness (circa 450-510 Hv) into three overlying sheets of high strength aluminium (611 T4), each of 3 mm thickness, using a die having a maximum cavity depth of 2.0 mm. The rivet has a shank outside diameter of 5.3 mm an inside diameter of 2.9 mm and an effective length of 12.0 mm. The die has a central "pip" extending upwardly from the bottom of the cavity which explains the undulating form of the underside of the joint. Examination of the joint established that the rivet had exhibited adequate column strength but the middle sheet had pushed through the lowermost sheet producing a crevice which is prone to corrosion. The middle sheet has not been pierced and as a result it had been dragged down and through the lowermost sheet preventing adequate interlock. It has been realised by the inventors that the rivet has insufficient bore volume to accommodate the displaced sheet material thus preventing effective interlock.

Figure 6B:
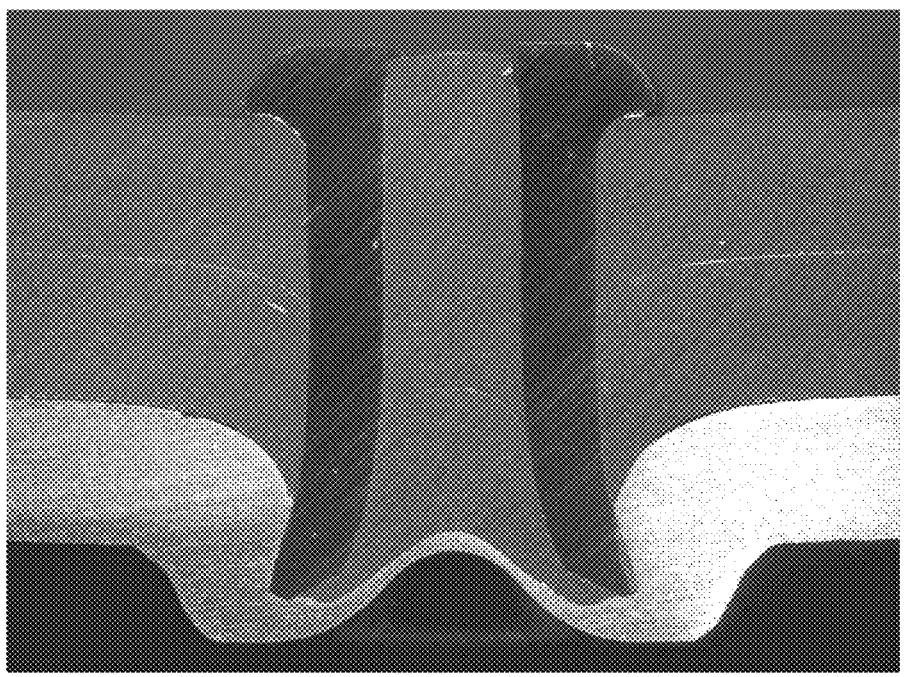

The self-piercing rivet of FIG. 6b is a tubular rivet in which the central bore extends through the head. The effective length of the rivet is 12.0 mm, the outside diameter of the shank 6.00 mm and the inside diameter of the shank 3.65 mm. The rivet has a medium/high hardness of 450-510 Hv. The joint has been produced using the same die as that used for the FIG. 6a joint. The geometry of the rivet helps to reduce the compressive stress experienced by the lowermost sheet during rivet insertion. As a result the lowermost sheet has not been reduced in thickness to a degree where the middle sheet has penetrated. The button formed on the underside of the joint is completely encapsulated by the lowermost sheet thus eliminating the risk of corrosion in the joint. The increased bore volume allows the middle sheet to be pierced successfully with an adequate and symmetric interlock in the lowermost sheet.

Figure 7A:
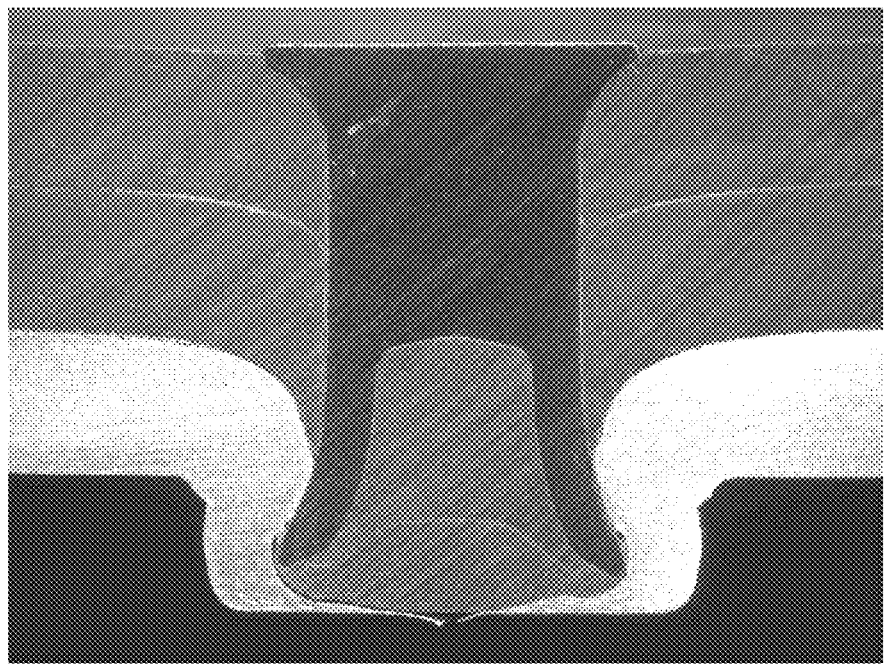
FIGS. 7a and 7b show sectioned views through two riveted joints prepared for comparative purposes: one using a prior art self-piercing rivet and the other using a self-piercing rivet in accordance with a fourth embodiment of the present invention.

FIG. 7a is an illustration of a joint produced by inserting a prior art self-piercing rivet of medium hardness (circa 450-510 Hv) into three overlying sheets of lower strength, higher ductility aluminium (NG 5754), each of 3.0 mm thickness, using a die having a cavity depth of 2.8 mm. The rivet has a countersunk style head, an outside shank diameter of 5.3 mm, an inside shank diameter of 3.2 mm and the effective length of the rivet is 12 mm. The lowermost sheet has been subjected to excessive thinning to the extent that the middle sheet has been pushed through. Fracture of the lower sheet provides a direct path for moisture ingress to reach the interface between the rivet and sheet material thus producing a potential for corrosion. The rivet also exhibited some compression and asymmetry. It has been realised by the inventors that even with the high volume die cavity the rivet bore exhibited insufficient volume to accommodate the displaced sheet material. Moreover, it has been established that the compression and asymmetry is due in part to the additional stress imposed when the bore is filled by the displaced upper and middle sheet material.

Figure 7B:
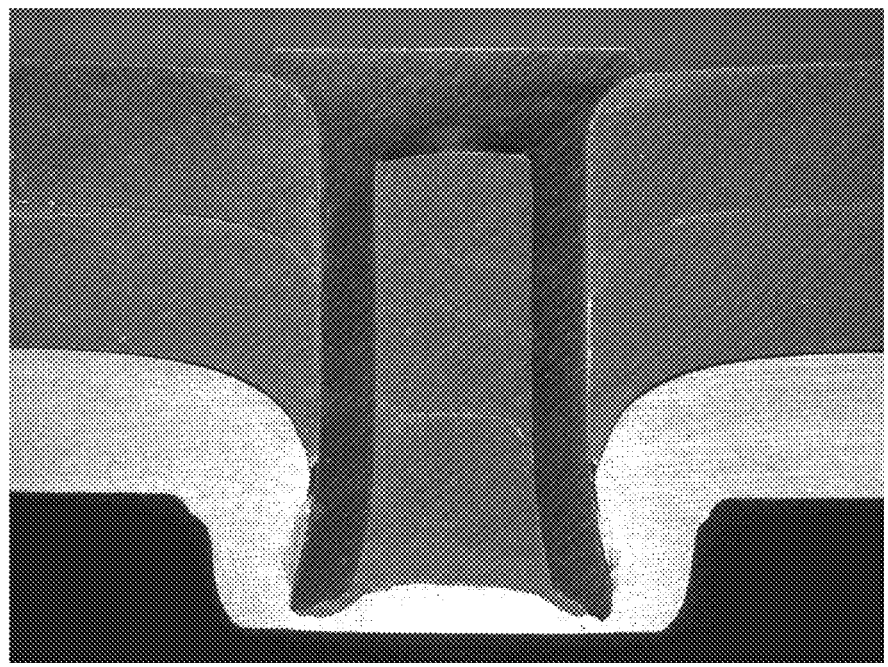

The joint shown in FIG. 7b was produced using a self-piercing rivet in accordance with the invention and which has an outside shank diameter of 6.00 mm, an inside shank diameter of 3.65 mm, an effective length of 12 mm and a hardness of 450 Hv to 510 Hv. The central bore in the rivet terminates just short of the underside of the head to provide an increased volume (and a relatively thin rivet web). The die was the same as that used in the production of the joint of FIG. 7a. Inspection of the joint shows that the rivet has sufficient column strength and an effective symmetric interlock with the lower sheet was achieved. The lowermost sheet has maintained sufficient thickness for the button to be completely encapsulated so that the risk of corrosion is significantly reduced. The high bore volume readily accommodates the displaced upper and middle sheet material and the rivet geometry helps to reduce the stress experienced by the lowermost sheet during rivet insertion.

Figure 8A:
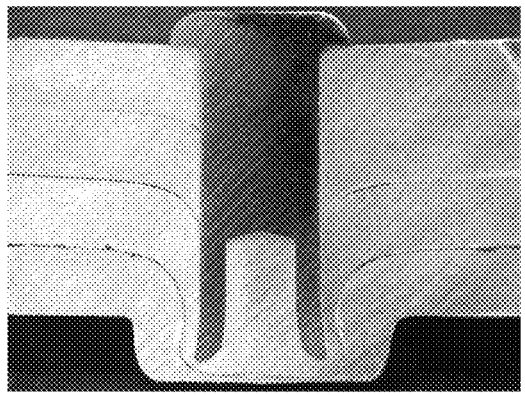
FIGS. 8a, 8c and 8d show sectioned views through three riveted joints prepared for comparative purposes: the first two using a prior art self-piercing rivet and the third using a self-piercing rivet in accordance with a fifth embodiment of the present invention.

FIG. 8a shows a joint produced by inserting a prior art self-piercing pan head rivet into four stacked sheets of high strength aluminium alloy (three sheets of 6111-14 and one sheet of 6111 PFHT) each 3.0 mm thick using a flat bottom die with a cavity depth of 2.8 mm. The rivet has a hardness of 530-580 Hv, an outside shank diameter of 5.5 mm, an inside shank diameter of 2.9 mm and an effective length of 14 mm. The middle sheets have not all been pierced by the rivet and as a result there is not an effective interlock with the lowermost sheet. It has been determined by the inventors that this deficiency is as a result of inadequate rivet bore volume. The relatively deep die prevents the middle sheet material being pushed through the lowermost sheet but the button formed on the underside of the lowermost sheet has several tears as indicated by arrows in FIG. 8b.

Figure 8B:
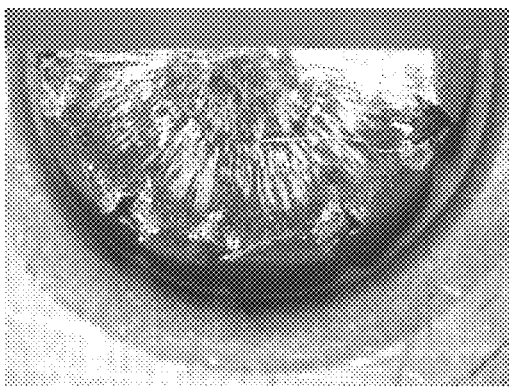
Figure 8C:
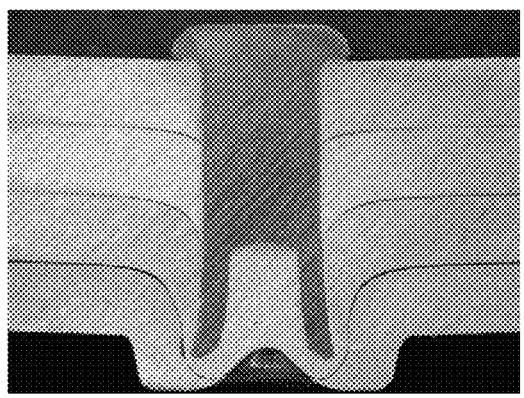

FIG. 8c shows a joint produced using a prior art self-piercing rivet identical to that used in the joint of FIGS. 8a and 8b and the same material for the sheet stack. In this instance the die has a cavity with an upstanding pip and a maximum depth of 2.0 mm. Although the shallower die prevents tearing of the lowermost sheet, the sheet immediately above has been pushed through the lowermost sheet rendering the joint prone to corrosion. It has been realised that this is as a result of inadequate rivet bore volume.

Figure 8D:
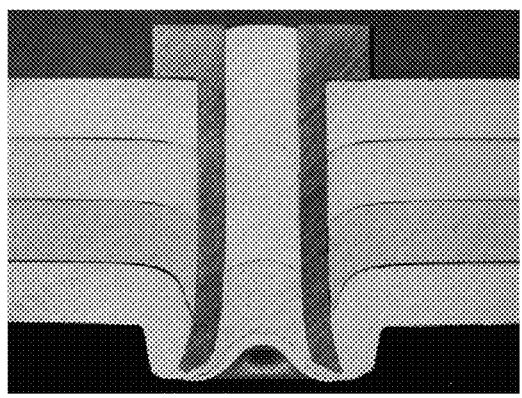

FIG. 8d shows a joint produced in an identical stack of material as used in FIGS. 8a to 8c using a tubular rivet in accordance with the present invention. In this instance the central bore extends through the full length of the rivet by penetrating through the rivet head. The rivet has a hardness of 530-58-Hv, an outside shank diameter of 6.5 mm, an inside shank diameter of 3.9 mm and an effective length of 15 mm. The die is the same as that used in the joint of FIG. 8c. The low die volume prevents tearing in the region of the button and the high bore volume allows the rivet to pierce the middle sheets and provide an effective interlock with the lowermost sheet without the lower middle sheet being pushed through.

In the embodiment of FIGS. 1 to 4 the bore volume is 38% of the effective solid volume of the rivet.

Other exemplary rivet embodiments of the present invention are shown in the table below:

| RIVET | L | H | W | D1 | D2 | Bore volume % |
|---|---|---|---|---|---|---|
| A | 7.0 | 2.5 | 3 | 6.5 | 4.0 | 38.21 |
| B | 8.0 | 2.5 | 3 | 6.5 | 4.0 | 38.17 |

-continued

| RIVET | L | H | W | D1 | D2 | Bore volume % |
|---|---|---|---|---|---|---|
| C | 9.0 | 2.5 | 3 | 6.5 | 4.0 | 38.13 |
| D | 12.0 | 2.5 | 3 | 6.5 | 4.0 | 38.07 |

The end column "Bore volume %" is the volume of the bore expressed as a percentage of the effective solid volume of the rivet as discussed above.

The invention has application to forming self-piercing riveted joints in thick stack (6 mm or over), high strength light metal alloys including for example, aluminium and magnesium alloys, which generally have a relatively low ductility. For the types of aluminium relevant to the invention, an ultimate tensile stress of, for example, over 300 MPa may be considered high strength and for magnesium alloys over 200 MPa. The rivet is suitable for stacks having a minimum thickness of 6.0 mm. In such applications the die is relatively shallow (the die cavity is generally less than approximately 2.0 mm in depth) to obviate the risk of the tearing of the lowermost sheet The invention also has application to forming self-piercing riveted joints in thick stacks (6.0 mm or over) lower strength light metal alloys. In order to produce such joints a deeper die cavity may be used such as for example up to 3.5 mm but larger depths may be used for particularly thick stacks.

It will be appreciated that numerous modifications to the above described design may be made without departing from the scope of the invention as defined in the appended claims. For example, the rivet head may take any suitable form depending on the joint required and may also perform a secondary function such as providing a male or female thread for attachment of a further component. Moreover, the particular dimensions specified may be varied depending on the application provided.

It is to be understood that the term "sheet" is used herein to refer to material produced by any process including for example casting, extruding or rolling. Such a sheet may be an integral part of a larger component which is not sheet-like in overall appearance.

Figure 9:
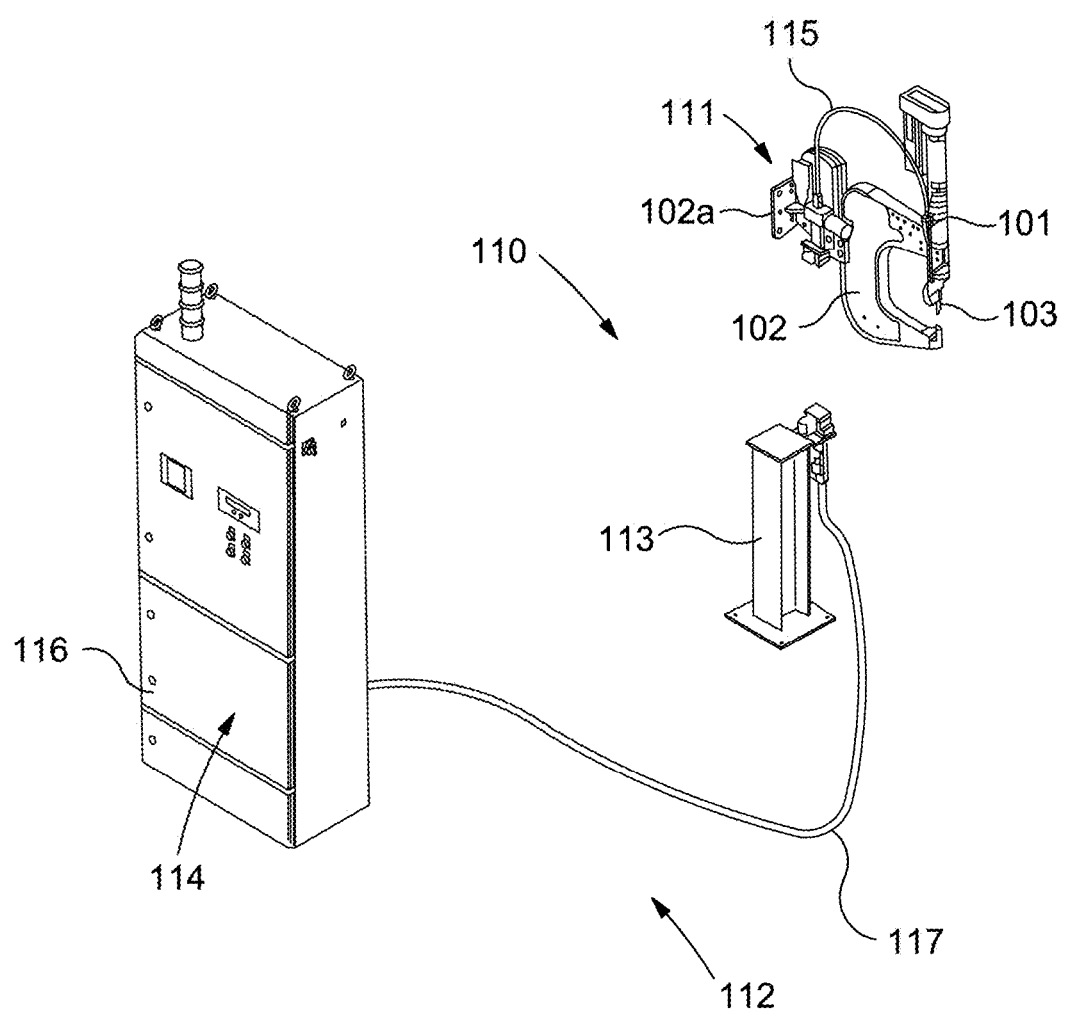
FIG. 9 is an embodiment of a rivet insertion system for use with the rivet of FIGS. 1 to 8.

An exemplary rivet insertion system for inserting the rivets in accordance with the described method is shown in FIG. 9.

A rivet setting tool 101 is mounted on an upper jaw of conventional C-frame 102 above a rivet-upsetting die 103 disposed on the lower jaw. Rivets 10 (not shown in FIG. 9) are inserted by the tool into a workpiece (not shown) supported over the die 103 as is well known in the art. It is to be appreciated that whilst the specific embodiment described herein relates to the feeding and insertion of rivets it has application to other fasteners. The C-frame is mounted on a robot manipulator (not shown) via a mounting bracket 102a such that it is movable with the tool 1 by the robot towards and away from the workpiece as required.

Rivets are delivered to the tool by feed apparatus 110 that comprises two principal sections 111, 112 releasably connectible together at a stationary floor-mounted docking stand 113 intermediate the tool 101 and a bulk source 114 of rivets. A first section 111, downstream of the docking stand 113, is carried on the C-frame 102 with the tool 101 and transports rivets from a tool-side docking interface 115 to a nose of the tool 101 for insertion into the workpiece. A second section 112, which is principally upstream of the docking stand 113, is connected between the bulk source 114 of rivets stored in a cabinet 116 and a stand-side docking interface 117 supported on the docking stand 113. The two sections 111, 112 are releasably connectable at the docking stand 113 by bringing the docking interfaces 115, 117 into register.

The rivet insertion tool 101 contains a reciprocal punch (not shown) by which the rivet is driven into the workpiece.

As is known, the cabinet 116 not only houses the bulk source of rivets (e.g. vibratory bowls with rivet orientation mechanisms) but also the compressed gas (e.g. air) deliver) systems required to propel rivets in the feed apparatus. It may house a programmable controller in the form of microprocessor-based hardware and operational software for controlling the operation of the feed apparatus and the rivet insertion apparatus, although this may be housed separately and connected by suitable cabling or other communication means to the cabinet. Such gas delivery and control systems are well known and will not therefore be described in detail herein.

The first and second sections 111, 112 dock together at the docking stand 113 at predetermined intervals in the riveting operation to collect rivets for the next riveting cycle, such rivets being temporarily stored in a buffer magazine that is integral with the first section 111 of the teed apparatus 110. The docking operation brings together the tool-side and stand-side docking interfaces 115, 117 of the rivet feed apparatus 110 and allows rivets to flow from the bulk sources 114 across the interfaces to the nose 104 of the setting tool 101.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A method for forming a joint in a stack of at least two sheets of light metal alloy, the stack having a thickness of at least 6.0 mm, using a self-piercing rivet comprising the steps of: positioning the stack over a die; providing a self-piercing rivet having a head and a substantially cylindrical shank that is at least partially hollow so as to define a bore that extends along at least part of the length of the rivet; positioning the rivet over the sheet stack at a position opposite the die; using a punch to set the rivet and force the rivet into the sheet stack such that the rivet pierces an upper surface of the stack and such that the shank deforms outwardly to interlock with the stack but without penetration to a die side of the stack; wherein an outside diameter of the shank is at least 6 mm, an effective length of the rivet is at least 1.3 times the diameter of the shank and the bore has a volume that is at least 38% of an effective solid volume of the rivet.

2. A method according to claim 1, where the stack has an ultimate tensile strength in the range 50-600 MPa.

3. A method according to claim 2, wherein the die has a die cavity having a maximum depth in the range 0.5 mm to 3.5 mm.

* * * * *